United States Patent [19]

Turner

[11] Patent Number: 4,748,093
[45] Date of Patent: May 31, 1988

[54] ELECTROCHEMICAL CELL COMPRISING ELECTRO-OSMOSIS-PROMOTER

[75] Inventor: Andrew D. Turner, Abingdon, England

[73] Assignee: United Kingdom Atomic Energy Authority, London, England

[21] Appl. No.: 947,907

[22] Filed: Dec. 31, 1986

[30] Foreign Application Priority Data

Jan. 15, 1986 [GB] United Kingdom ............... 8600894

[51] Int. Cl.[4] .................................................. H01M 2/38
[52] U.S. Cl. ................................. 429/81; 429/215; 429/225; 429/248
[58] Field of Search ................ 429/81, 72, 206, 204, 429/225, 212, 215, 248

[56] References Cited

U.S. PATENT DOCUMENTS

| | | | |
|---|---|---|---|
| 1,841,998 | 1/1932 | Wilderman | 429/81 |
| 3,021,379 | 2/1962 | Jackel | 429/247 |
| 3,333,986 | 8/1967 | Chreitzberg et al. | 429/81 |
| 4,177,328 | 12/1979 | Rogers | 429/81 |
| 4,555,454 | 11/1985 | Shuster | 429/81 X |

Primary Examiner—Anthony Skapars
Attorney, Agent, or Firm—Larson and Taylor

[57] ABSTRACT

An electrochemical cell, e.g. a lead acid electric storage cell, comprises a positive electrode, a negative electrode, an aqueous electrolyte and, optionally, a porous cell component such as a cell separator interposed between the electrodes. To enhance access of electrolytes to one or both of the electrodes or to the component during operation of the cell and thereby improve cell performance, at least one of the component and the electrodes is porous and includes a promoter in the form of solid material other than graphite having, under the operating conditions of the cell, a zeta potential of such magnitude and polarity as to be capable of inducing electro-osmotic flow of electrolyte into the component or electrode when a current is flowing through electrolyte filled pores thereof. An example of such a material (termed an 'electro-osmosis promoter') is sulphonated polyvinylidene difluoride.

12 Claims, 3 Drawing Sheets

ELECTROCHEMICAL CELL COMPRISING ELECTRO-OSMOSIS-PROMOTER

This invention relates to electrochemical cells such as lead acid electric storage cells.

A lead acid storage cell, the positive electrode of which comprises electrochemically active lead dioxide carried on a lead grid, is well-known. A problem in the performance of such cells is the low speed of replenishment of electrolyte at the electrode surface, particularly at high current densities, resulting in low effective utilization of the electrochemically active material. Solutions that have been suggested for improving electrolyte flow have included modifying the porosity of the electrode to encourage a more effective diffusion of electrolyte into the inner regions of the electrode, and causing electrolyte to flow through the pores of the electrode under hydrostatic pressure. However, both of these solutions have their drawbacks: there is a limit to how far porosity can the increased without adversely affecting mechanical strength and acceptable electrode capacity for a given volume, and provision of a circulating pump is a parasitic drain on the system and is accompanied by a need to seal the electrode periphery in order to cause electrolyte to flow through, rather than around, the electrode. Similar considerations apply in the case of the negative electrode of a lead acid storage cell and in the case of porous cell components such as separators interposed between the electrodes.

A way of enhancing electrolyte availability in the pores of the electrochemically active layer of battery electrodes and of such interposed components without extra complexity such as the need for mechanically moving parts and without extra electrical load on the battery has now been devised. Thus, in one aspect, the invention provides an electrochemical cell comprising a positive electrode, a negative electrode, an aqueous cell electrolyte and, optionally, a porous cell component interposed between the electrodes, at least one of the cell component and the electrodes being porous, characterised in that said at least one of the cell component and the electrodes includes a promoter in the form of a solid material other than graphite having, under the operating conditions of the cell, a zeta potential of such magnitude and polarity as to be capable of inducing electro-osmotic flows of electrolyte into said at least one of the cell component and the electrodes when a current is flowing through electrolyte containing pores thereof.

The cell may be any electrochemical cell but is preferably a secondary cell such as a lead-acid storage cell when the solid material (termed an 'electro-osmosis promoter' herein) may be in association with lead dioxide constituting electrochemically active material in the positive electrode and/or may be in association with lead constituting electrochemically active material in the negative electrode. The electrochemically active material and the electro-osmosis promoter are both supported on a carrier, which may be a grid or in a tube. Electro-osmosis promoters may, however, be used to enhance the performance of other aqueous batteries or fuel cells, for example alkaline systems.

The magnitude and polarity of the zeta potential of the 'electro-osmosis promoter' can be chosen to induce a flow so as to replenish electrolyte consumed in the electrode reaction, for example, to balance the fluxes. The induced flow is proportional to the zeta potential and also to the current, and is inversely proportional to the electrolyte conductivity. Flow is therefore increased at higher currents, thereby matching the larger demand on electrolyte. Flow is also directed to those regions of low electrical conductivity that have become depleted in the electrolyte.

The invention thus effectively provides a simple in situ pump with no external moving parts wherein the flow rate is regulated by the current demand on the cell to replenish electrolyte consumed within the electrode or component in the cell.

Improved electrolyte access to the electrochemically active material of an electrode not only increases utilization of the latter, especially at higher rates of discharge, and increases energy storage capacity and efficiency, but also ensures that the discharge reaction is more uniformly distributed throughout the thickness of the electrode, thereby increasing the cycle life. Also, cell potential during discharge may be maintained and with increasing current, and electrode life may be increased by reducing grid corrosion.

In the case of an interposed component such as a separator, one or more layers of an electro-osmosis promoter may be incorporated in the separator such that electrolyte being transported therethrough by electro-osmosis in more dilute, lower conductivity electrolyte regions is being replaced by convection from stronger electrolyte at the bottom of the cell, thus effectively mixing the electrolyte which, in the case of the lead-acid storage cell, is acid.

When the cell is a lead-acid storage cell, examples of electro-osmosis promoters suitable for the positive electrode where the electrochemically active material is lead dioxide and where a negative zeta potential is required are polymers having pendant sulphonate and halide groups such as sulphonated polyvinylidene difluoride, and inorganic oxides such as chromium(III) oxide. Graphite is excluded because it is known to incorporate graphite in the positive electrode for a lead acid storage cell, for example as described in GB-B-2124521 and A. Tokunaqa, M. Tsubota, K. Yonezu and K. Ardo, Proceedings of the Symposium on the Advances in Lead-Acid Batteries, Ed. K. R. Bullock, D. Pavlov, Battery Division, Electrochemical Society PV 84-14 (1984) 451. However, neither of these documents describes the graphite as functioning as an electro-osmosis promoter and, in the latter document, improvements in cell performance are attributed simply to changes in electrode porosity. Also, graphite has the disadvantage of being slowly consumed by oxidation during anodic overcharge conditions.

Sulphonated polyvinylidene difluoride (referred to herein as SPVDF) is noteworthy as an electro-osmosis promoter in the present invention. Thus, it has a large negative zeta potential over the whole acid concentration range likely to occur in a lead-acid storage cell giving rise to a substantial electro-osmotic pumping effect. Also, in the lead-acid storage cell, its zeta potential is sufficiently greater than that of $PbSO_4$ to overcome the electro-osmotic flow in the opposite direction induced by the positive $PbSO_4$. Further, SPVDF has the advantages of being wettable by sulphuric acid, being oxidation resistant, being insoluble and being resistant to attack by 5M $H_2SO_4$.

Also, SPVDF may advantageously be used on part only of the positive electrode of a lead-acid storage cell. For example, if one face only of a $PbO_2$-containing plate electrode carries SPVDF, on discharge of the cell, electro-osmotic pumping will force fresh electrolyte (e.g. 5M $H_2SO_4$) into the internal pores of the plate, and the $PbSO_4$ formed at the face not carrying SPVDF will, due to its positive zeta potential, force electrolyte out of the plate. The overall effect is therefore to pump the electrolyte through the plate without the need for any external pressure.

When the cell is a lead-acid storage cell and an electro-osmosis promoter is included in the negative electrode, i.e. the electrochemically active material is lead and a positive zeta potential is required, the electro-osmosis promoter must not be reducible or soluble in sulphuric acid. Possible examples are ceramic oxides such as aluminium oxide, titanium(IV) oxide and zirconium(IV) oxide; hydroxyapatite; and substances with functional groups that can be protonated such as quinones, pyridines and tertiary amino groups on a polymeric framework. However, since the lead sulphate produced on discharge has a large positive zeta potential, use of a promoter may be unnecessary in these circumstances.

The electro-osmosis promoter, may, for example, be particulate, and if so and if included in one or both of the positive and negative electrodes, must have a particle size significantly less than that of the electrochemically active material, for example about 10% less, so that the particles of the promoter may become lodged in the pores through the electrode without causing blocking. For example, the particle size of the electro-osmosis promoter may be in the range of 0.5 μm to 5 μm.

Electrodes for use in the invention may be made by the method of admixing the electrochemically active material with the 'electro-osmosis' promoter either before or after the electrochemically active material is adhered to the carrier, and then incorporated into an electrochemical cell. The method may be carried out in a number of ways. For example, the promoter may be mixed with a battery paste of lead monoxide, water and sulphuric acid (known in the art), which paste is pressed into a lead grid and subsequently treated electrochemically to convert the lead monoxide to lead dioxide. In the case, for example, of SPVDF, it can be incorporated into the electrode structure as a surface membrane, as fibres or particles mixed with the electrode paste, or impregnated into the electrode by applying a solution of SPVDF in a solvent and subsequently removing the solvent, the solvent and the concentration of the solution being selected so that the SPVDF is deposited in microporous form at the surface of the electrode. The latter may be particularly beneficial because electro-osmotic pumping may be most effective when the SPVDF is provided at the electrode surface. Finally, SPVDF may act as a surface binder for the $PbO_2$ thus reducing paste shedding and prolonging cell life. Also, the promoter can be mixed with chemically prepared β-lead dioxide, the use of which is described in GB-B-2 124 521, and mechanically applied to a current collector. For preparation of flat plate electrodes, a binder is usually necessary, but for tubular electrodes, a binder is not necessary. Preferably, the electrode design is such that, in operation, depleted electrolyte may leave the electrode in such a way as not to impede the influx of fresh electrolyte, for example by providing the electrode with a central portion of sandwich grid structure as a route for depleted electrolyte to the bulk electrolyte in the cell.

Electrodes prepared as above may be incorporated into a storage cell by methods known in the art.

The following examples illustrates the invention. Reference will be made to the accompanying drawings in which.

EXAMPLE 1

Preparation of Sulphonated Polyvinylidene Difluoride

Polyvinylidene difluoride powder (particle size 35–60 μm) was treated with oleum at room temperature for about 19 hours. The product sulphonated powder was separated from the oleum, dried and washed in water, and found to be spherical in shape and to have a particle size in the range of 25–50 μm as assessed by optical microscopy.

Preparation of Positive Electrode

The above-prepared powder (2 g) was dissolved in N,N-dimethylformamide (25 ml) at 50° C. to give a pale yellow solution. Two lead dioxide plates in a 'back to back' or 'sandwich' arrangement were thoroughly washed and then completely dried. The solution was dropped onto the surface of one side of the 'sandwich' to effect covering and allowed to soak through and dry. This was repeated for the other side of the 'sandwich'. The whole process was then repeated four times and the two electrodes sealed around their periphery to ensure that all the electo-osmotically pumped fluid could be collected.

Construction and Testing of Electrochemical Cell

Figure 1:
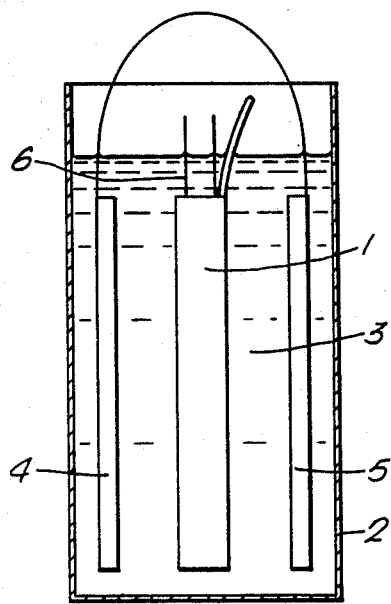
FIG. 1 is a schematic diagram of a test cell of the invention.

The above-prepared 'sandwich' electrode was assembled in a test cell as shown in FIG. 1. Referring to the figure, the 'sandwich' electrode 1 as positive electrode is centrally positioned in a container vessel 2 carrying electrolyte liquid 3 (5M sulphuric acid). Two lead electrodes 4 and 5 are also positioned in the electrolyte liquid 3. An open glass tube 6 is situated on the upper end of the sandwich electrode 1.

To test the cell shown in FIG. 1, the levels of electrolyte 3 in the container 2 and in the glass tube 6 are hydrostatically balanced. The cell is discharged by making appropriate electrical contacts and the flow of electrolyte into the glass tube 6 measured by collecting the electrolyte electro-osmotically pumped therein through the 'sandwich' electrode 1 using a Delta pump (not shown). The experiment was carried out at discharges of 1975 mA and 1235 mA and, by way of comparison, at a discharge of 1990 mA when the 'sandwich' electrode 1 did not contain any sulphonated polyvinylidene difluoride. The results are summarised in FIG. 2 wherein ○ are values at 1975 mA ▽ are values at 1235 mA □ are values at 1990 mA (comparison)

Figure 2:
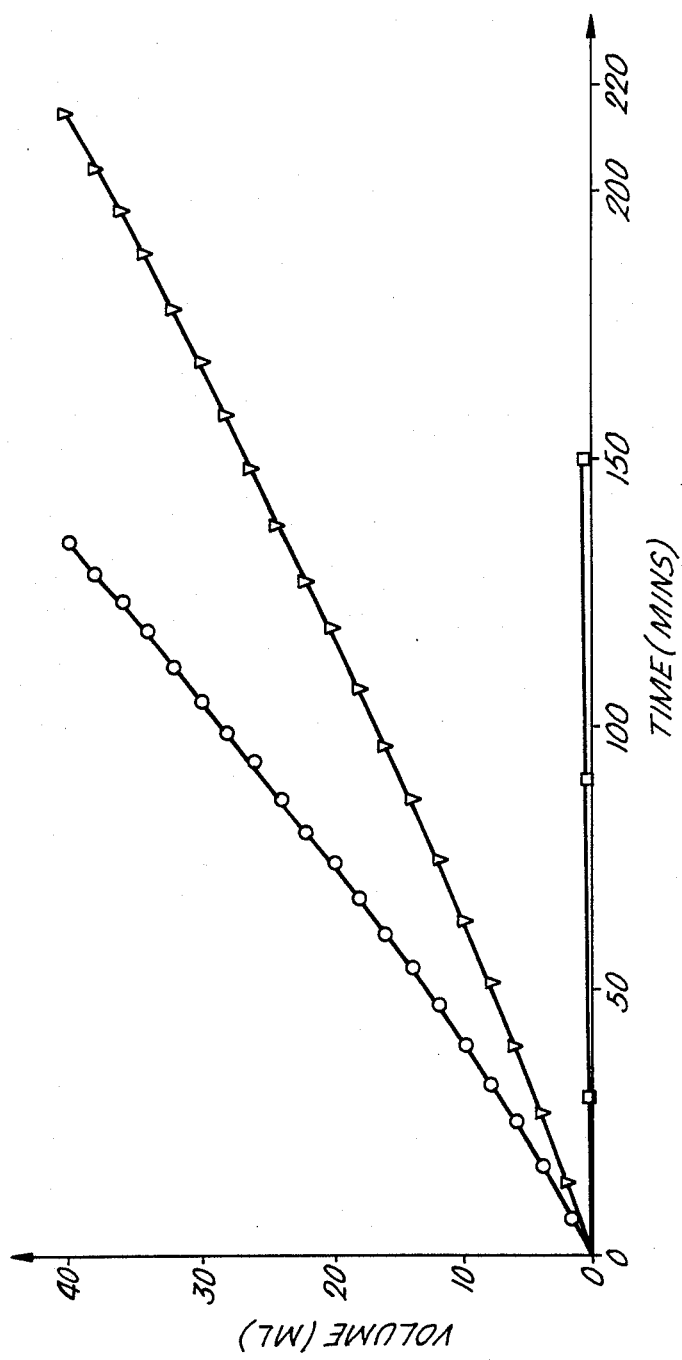
FIG. 2 is a graph showing the relationship between volume of electrolyte produced and time for the cell of FIG. 1 and for a comparison cell.

The graphs in FIG. 2 show that the presence of the sulphonated polyvinylidene difluoride significantly enhanced the flow of electrolyte through the 'sandwich' electrode 1. Other conclusions from the experiments were that the flow of electrolyte was proportional to the current passed, and that the strength of the electrolyte emerging from the 'sandwich' electrode 1 by electro-osmotic flow was reduced below its initial value of 5M due to electrode reaction depletion.

EXAMPLE 2

Comparison Cell

A $PbO_2$ plate (2 mm thick) from a commercial battery was cut to 120×54 mm in size and assembled in a cell as a centrally mounted positive electrode about which two plates encased in microporous bags as negative electrodes were disposed. The inter electrode gaps were filled with felt spacers and the cell inserted into a cell case so that the cell was under slight compression. The electrolyte was 5M $H_2SO_4$. The whole cell was immersed in a constant temperature water bath kept at 25° C. and the cell cycled 30 times at 2 amps giving 1.69 hours discharge to condition the plates.

The cell was then subjected to 4 Amp discharges, followed by charges at 1.6 Amp sufficiently long to ensure that the cell was fully recharged (14–25% overcharge).

Cell of the invention (test cell)

The positive plate of the above cell was removed, thoroughly washed with water, dried for 8 hours at 50° C. and dried for a further 3 hours at 50° C. in a vacuum oven. One side of the plate was coated with SPVDF applied by spraying three coats of a solution of SPVDF in dimethyl formamide (53 g/) using a commercial air spray. The resulting loading of SPVDF was 8.2 mg/cm² due to overspray losses. Residual solvent was removed by drying in an oven at 50° C. for 8 hours.

Figure 3:
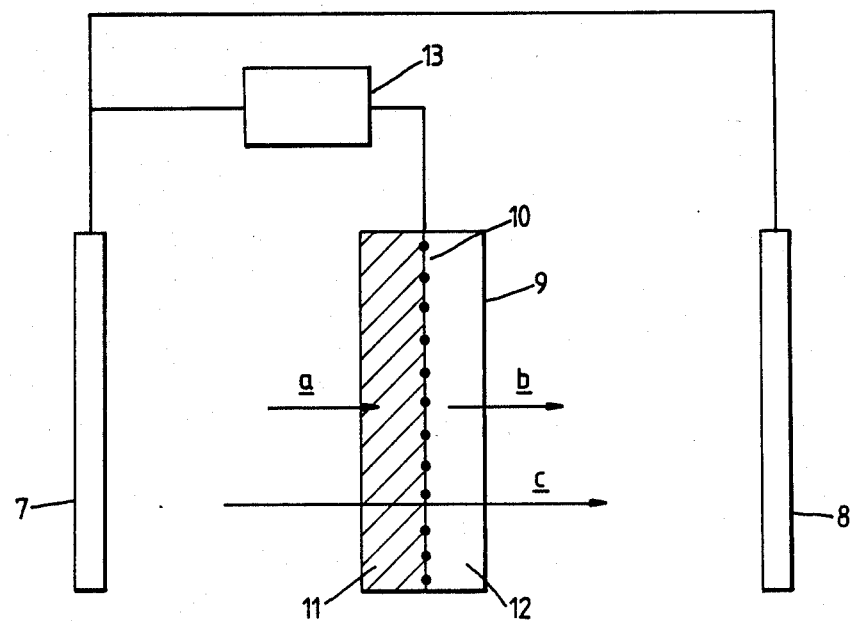
FIG. 3 is a schematic diagram of a cell of the invention where the positive electrode is in the form of a plate, one face only of which is provided with an electro-osmotic promoter.

The plate was replaced in the cell to give the arrangement shown schematically in FIG. 3. Referring to the figure, two lead plates 7 and 8 as negative electrodes are positioned one on each side of the treated plate 9 as positive electrode. The treated plate 9 comprises a grid 10 carrying $PbO_2$ and one side 11 is coated with SPVDF and the other side 12 not. The discharge load is shown by the numeral 13. The cell was discharged and charged as for the comparison cell. Referring again to FIG. 3, the arrows a, b and c show electrolyte flow on discharge: arrow a shows electro-osmotic flow due to SPVDF, arrow b electro-osmotic flow due to $PbSO_4$, and arrow c the overall flow.

Results

The discharge capacities (Ah), averaged over five cycles for the comparison cell and over six cycles for the test cell, are given below for a 0.2 V drop of cell voltage, capacity to 1.7 V cell voltage and capacity to 100% depth of discharge.

|  | 0.2 V potential fall | to 1.7 V cell potential | Total Capacity |
|---|---|---|---|
| Comparison Cell | 2.0 | 2.4 | 2.56 |
| Test Cell | 3.0 | 2.72 | 3.12 |

It can be seen that the SPVDF has resulted in a 22% improvement in total discharge capacity. This improvement is 13% when comparing discharge capacities to 1.7 V primarily due to a 0.04 ohm resistance observed during discharge of the test cell. With a 4 Amp discharge current, this gave rise to a resistance drop of 0.16 volts and although this may have been due to the SPVDF, or even an adventitious contact resistance, a reduction in SPVDF loading could improve this without reducing the electro-osmotic pumping effect. Also, use of other solvents or solvent mixtures might give a more porous layer.

A comparison of discharge capacities under 0.2 V potential fall demonstrates a 50% improvement for the test cell if the above-mentioned cell resistance effect is ignored. The discharge voltage versus time profiles for the test and comparison positive plates were obtained and illustrate the improvement in acid access that has led to this enhancement. Thus, the fall-off in potential due to a polarization depletion of electrolyte concentration in the plate pores is significantly less marked for the test plate. This is due to electro-osmotic enhancement of electrolyte replenishment produced by the flow of discharge current.

EXAMPLE 3

Zeta Potentials

Also, separate experiments were carried out to measure the zeta potentials of certain materials over a range of sulphuric acid concentrations. Thus, the zeta potentials of dispersed particulate $PbSO_4$ were measured by microelectrophoresis and those of microporous membranes of sulphonated polyvinylidene difluoride (thickness 0.45 m) using a dip cell apparatus. The results are given below in mV:

|  | Sulphuric Acid Concentration (M) | | | | |
|---|---|---|---|---|---|
| Material | 5 | 1 | 0.1 | 0.01 | 0.001 |
| $PbSO_4$ | +836 | +684 | +90 | +16 | 0 |
| SPVDF (oleum sulphonated) | −2560 | −1700 |  | −84 | −30 |
| SPVDF (25 h room temp. sulphonation with chlorosulphonic acid) | −2400 |  |  |  | −27 |
| SPVDF (heat treatment with chlorosulphonic acid) | −2300 |  |  |  | −20 |

The SPVDF samples wer prepared by sulphonating a "Durapore" polyvinylidene difluoride membrane (ex Millipore (UK) Ltd) using the method indicated in brackets. The results show that the zeta potentials of the SPVDF samples numerically exceed those of the $PbSO_4$ over a wide range of sulphuric acid concentrations, thus accounting for the results obtained in Example 2 above.

I claim:

1. An electrochemical cell comprising a positive electrode, a negative electrode, and an aqeuous cell electrolyte, at least one of the electrodes being porous and including a promoter in the form of a solid material other than graphite having, under operating conditions of the cell, a zeta potential of such magnitude and polarity as to be capable of inducing electro-osmotic flow of electrolyte through said at least one of the electrodes when a current is flowing through electrolyte containing pores thereof.

2. An electrochemical cell according to claim 1 wherein the promoter is carried at the surface of said at least one of the electrodes.

3. An electrochemical cell according to claim 1 wherein the cell is a lead-acid storage cell and the positive electrode thereof includes a promoter.

4. An electrochemical cell according to claim 3 wherein the promoter has a negative zeta potential that numerically exceeds that of lead sulphate over the range of sulphuric acid concentrations occurring during operation of the cell.

5. An electrochemical cell according to claim 4 wherein the zeta potential of the promoter numerically exceeds that of leads sulphate in the sulphuric acid concentration range of 0.001 M to 5 M 6. An electrochemical cell according to claim 4 wherein the promoter is a polymer having pendant sulphonate and halide groups.

7. An electrochemical cell according to claim 6 wherein the promoter is sulphonated polyvinylidene difluoride.

8. An electrochemical cell according to claim 3 wherein the positive electrode is in the form of a plate, one side of which carries the promoter and the other side of which does not.

9. An electrochemical cell according claim 2 wherein the promoter is in microporous form.

10. An electrochemical cell according to claim 1 wherein at least one of the electrodes comprises an electrochemically active material and wherein said electrochemically active material and said promoter are both supported on a carrier.

11. An electrochemical cell according to claim 2 wherein the promoter is incorporated into the electrode structure as a membrane.

12. An electrochemical cell according to claim 3 wherein the promoter is incorporated into the electrode structure as a membrane.

* * * * *